(12) United States Patent
Edelson

(10) Patent No.: US 6,351,095 B1
(45) Date of Patent: Feb. 26, 2002

(54) POLYPHASE INDUCTION ELECTRICAL ROTATING MACHINE

(75) Inventor: Jonathan Sidney Edelson, North Plains, OR (US)

(73) Assignee: Borealis Technical Limited, Gibraltar ( * ) Notice: Subject to any disclaimer, the term of this patent is extended or adjusted under 35 U.S.C. 154(b) by 0 days.

(21) Appl. No.: 09/415,701

(22) Filed: Oct. 11, 1999

Related U.S. Application Data (63) Continuation-in-part of application No. 09/255,291, filed on Feb. 22, 1999, and a continuation-in-part of application No. 08/715,482, filed on Sep. 18, 1996, now Pat. No. 6,054,837.
(60) Provisional application No. 60/152,642, filed on Sep. 7, 1999, and provisional application No. 60/133,547, filed on May 11, 1999.

(51) Int. Cl.[7] ................................................. H02P 7/62
(52) U.S. Cl. ....................................... 318/801; 318/807
(58) Field of Search .......................... 318/727, 798–801, 318/807–811

(56) References Cited

U.S. PATENT DOCUMENTS

| | | | | |
|---|---|---|---|---|
| 3,387,205 A | * | 6/1968 | Tesdall | |
| 3,663,877 A | * | 5/1972 | Clark | 318/254 |
| 4,751,448 A | * | 6/1988 | Auinger | 318/773 |
| 4,928,051 A | * | 5/1990 | Demeter et al. | 318/731 |
| 5,661,379 A | * | 8/1997 | Johnson | 318/139 |
| 5,786,673 A | * | 7/1998 | Johnson | 318/139 |

* cited by examiner

Primary Examiner—Bentsu Ro

(57) ABSTRACT

An electrical rotating machine comprises an inverter drive system wherein alternating current comprising more than three phases is produced from the inverter drive system. The machine further includes a stator comprising a plurality of slots and windings, wherein the windings are electrically coupled to the inverter drive system and a winding chording factor of the stator is approximately 1. Further, a winding distribution factor of the stator could also be approximately 1. A rotor in the machine is electromagnetically coupled to a rotating magnetic field generated by the windings and the rotating magnetic field has a flux density level that exhibits saturation effects.

70 Claims, 2 Drawing Sheets

POLYPHASE INDUCTION ELECTRICAL ROTATING MACHINE

REFERENCE TO RELATED APPLICATIONS

This application claims priority from U.S. Provisional Application No. 60/152,645, filed Sep. 7, 1999, and U.S. Provisional Application No. 60/133,547, filed May 11, 1999; and this application is a continuation-in-part of U.S. application Ser. No. 09/255,291, filed on Feb. 22, 1999, and a continuation-in-part of U.S. application Ser. No. 08/715,482, filed on Sep. 18, 1996 and issued as U.S. Pat. No. 6,054,837. The text of each of the preceding applications is hereby incorporated by reference in its entirety.

FIELD OF INVENTION

This invention is related to the field of electrical rotating machinery for the conversion between electrical energy and mechanical energy.

BACKGROUND OF THE INVENTION

The basic principal of nearly all electrical rotating machinery is that a current of electrical charge located within a magnetic field will experience a force perpendicular both to the flow of charge and the lines of force of the magnetic field. Most electrical rotating machines make use of this principal by generating a magnetic field directed radially about a cylinder, causing current to flow axially along the cylinder, thus developing a tangential force which causes the cylinder to turn. Other geometries are possible, for example, so called 'axial flux' machines make use of a magnetic field generally parallel to the axis of rotation, and a generally radial current flow, again causing tangential force and thus causing rotation. If a conductor is forced through a magnetic field by some sort of external prime mover, then an electrical current can be caused to flow; this is the principal of the generator.

In the method of the AC induction motor, a rotating magnetic field is produced by the stator or stationary portion of the machine. This rotating magnetic field has two functions. First, it interacts with current carried by conductors of the rotor, causing the rotor to turn. Second, it produces the rotor currents by means of transformer action. Thus the rotor needs no connections to means of electrical supply, and is simply supported by bearings which allow free rotation. Such design simplifies motor construction, and greatly enhances motor reliability. The essence of the AC induction motor, and by extension the AC induction generator, is the production of a smoothly rotating magnetic field in the stator.

The rotating magnetic field is produced by coils of wire or windings, suitably placed in the stator. Each winding, when energized with a direct current, would produce a fixed magnetic field. By energizing a winding with a sinusoidal alternating current, a smoothly varying magnetic field of fixed orientation may be produced. Finally, by placing several windings of differing orientation within the same stator, and energizing the windings with alternating currents of differing phase, a rotating magnetic field may be produced which is the sum of the time varying fixed orientation magnetic fields generated by each winding/phase.

The difficulty with this approach is that production of a smoothly rotating magnetic field depends upon two factors. First, the fixed magnetic field generated by each winding must have a generally sinusoidal distribution of intensity. Second, the alternating currents used to energize the winding must also be sinusoidal in nature. Any deviation from the ideal sinusoidal relations will produce harmonic rotating magnetic fields, that is magnetic fields which rotate at a different rate and/or direction from the fundamental field. These rotating fields are superimposed and added to the fundamental rotating magnetic field. Each of these harmonic fields exerts its own pull upon the stator, reducing power output, and each results in its own electrical losses, again making the motor less efficient.

Harmonic fields generated by the non-sinusoidal nature of the field generated by each winding are termed spatial harmonics or air-gap harmonics. Harmonic fields generated by non-sinusoidal drive wave-forms are termed temporal harmonics.

Methods for the analysis of harmonic rotating magnetic fields in three phase induction machines are known, and may be found in textbooks on rotating machinery.

Spatial harmonics are mitigated in three phase machines through the use of distributed windings and chorded windings. These are winding techniques which result in a decrease in the fundamental efficiency of the machine, increasing resistance losses in the windings by up to fifteen percent or more. However these winding techniques disproportionately reduce the strength of harmonic fields. The net result is that both machine operation and total efficiency is improved.

Temporal harmonics are only considered a problem with the advent of inverter based variable frequency motor control systems. These systems produce wave-forms rich in harmonic content. Mitigation of these harmonics has been limited to improving the characteristics of the inverter drive systems, reducing the harmonic content of the output wave-forms through pulse shaping and higher switching frequencies.

Temporal harmonics also become a problem when high magnetic saturation levels are used. Ferromagnetic materials are used in motor construction because of the much higher magnetic fields which are developed for a given current flow. However, as the magnetic field strength is increased, the relationship between current flow and generated magnetic field becomes nonlinear. Even if a perfectly sinusoidal alternating current is applied to a winding, temporal harmonics in the resulting magnetic field will be generated. The intensity of these harmonics increases with increasing saturation, thus setting a limit on the saturation levels which may be used. Winding techniques cannot effectively reduce the strength of harmonic fields generated by high saturation in three phase machines.

SUMMARY OF THE INVENTION

From the foregoing, it may be appreciated that a need has arisen for a polyphase induction electrical rotating machine that overcomes the disadvantages of the prior art. In the present invention, an AC induction machine is operated by an inverter drive system. The stator is wound with little or no chording, meaning a chording factor of 1, and with little or no winding distribution, meaning a winding distribution factor of 1, both allowing windings with fewer turns to be used. Thus, resistance losses owing in the stator windings are reduced. Large machines with low pole counts are facilitated by the reduced winding distribution, again enhancing efficiency because low pole count machines are more efficient. Great control of stator magnetic field structure is possible, to the point that motor pole configuration may be changed purely electronically.

The present invention reduces substantially the problems associated with harmonic rotating magnetic fields.

Specifically, the use of many phases causes harmonic fields up to a number equal to the number of phases to rotate in synchronism with the fundamental rotating magnetic field. Both spatial harmonic rotating magnetic fields and temporal harmonic rotating magnetic fields are still developed, but such rotating fields add beneficially to the fundamental rotating magnetic field of the machine. Harmonics of higher order than the number of phases still excite non-synchronous rotating fields; however such high order harmonics are in general very weak. Thus motor efficiency losses associated with harmonic rotating magnetic fields are reduced.

The present invention allows for the use of drive waveform with high harmonic content, and in an embodiment of the present invention, square wave inverters are used in place of the more complex and expensive sine wave inverters to drive the induction rotating machine. The present invention allows for the use of high saturation levels, and in an embodiment of the present invention high voltage is used to produce high flux densities, thus increasing the overload output capabilities of the induction rotating machine. Further, the present invention may be driven by alternating current having different wave-forms, for example a square wave-form or a sinusoidal wave-form.

Accordingly, besides the objects and advantages of the methods of operating an AC induction machine described above, several objects and advantages of the present invention are the following:

It is a technical advantage of the present invention to provide a method by which rotating machinery of few poles can be constructed which demonstrate good chord factor and winding distribution factors. Another technical advantage of the present invention is that rotating machinery with low pole counts, and thus greater efficiency and capability, can be used where high pole count machines are currently being used.

It is a technical advantage of the present invention to provide a method by which current inverter technology can be used in a new and beneficial fashion through the use of more than three inverter phases. A yet another technical advantage of the present invention is that all of the technology developed for three phase inverters may be applied to a more efficient method of operating electric motors. The technological advances include pulse width modulation inverters, current mode, voltage mode, switching rate dither, or the like. Any present or future developments in inverter design will be immediately applicable to the present invention.

A still another technical advantage of the present invention is that the use of multiple inverters will enhance system fault tolerance. Should an inverter leg fail, only a single motor winding will cease to function, and most of the motor capacity will remain available. Yet another technical advantage of the present invention is that currently available inverter technology may be used to enhance the efficiency and performance of electrical rotating machinery.

It is another technical advantage of the present invention to enhance the stall torque and reduce the stall power consumption of electric motors. Also, a technical advantage of the present invention is that a given size electric motor will be more capable of starting inertial loads. When operated as a generator for regenerative braking purposes, a given size induction machine will be more capable of stopping inertial loads.

A technical advantage of the present invention is that inertial loads will be more quickly brought up to running speed. A yet another technical advantage of the present invention is that less energy will be dissipated when starting and stopping electrical rotating machinery.

Another technical advantage of the present invention is that a smaller motor may be used on large inertial loads, allowing the motor to operate much nearer to full power after the inertial load is accelerated to operational speed. This will enhance the efficiency of such systems as N motors are more efficient when operated nearer to full power.

It is another technical advantage of the present invention to reduce the zero load power consumption of electric motors. Still another technical advantage of the present invention is that motor operation will be more efficient, especially so at low duty factors. Further, another technical advantage of the present invention is that stator heating will be significantly reduced.

Additionally, it is a technical advantage of the present invention to provide greater reliability through redundancy in drive electronics. Moreover, another technical advantage of the present invention is that the motor and drive system will continue to function although a single inverter may fail.

A technical advantage of the present invention is that the smaller inverter modules may be constructed as inexpensive replaceable units, facilitating repair. It is another technical advantage of the present invention to provide a method of operating electrical rotating machinery in which the winding distribution and winding chord factors are minimized.

An additional technical advantage of the present invention is that the winding copper is more effectively used. A yet additional technical advantage of the present invention is that rotating machine efficiency is enhanced.

Further objects and advantages of this invention will become apparent from a consideration of the figures and the ensuing descriptions.

DESCRIPTION OF THE DRAWINGS

For a more complete understanding of the present invention and the technical advantages thereof, reference is now made to the following description taken in conjunction with the accompanying drawings, in which.

DESCRIPTION OF INVENTION

The present invention comprises an AC induction machine connected to an inverter drive system capable of providing necessary power to the induction machine. Applicant has prior applications in this field, including the applications mentioned above and U.S. application Ser. No. 08/350,737, filed Dec. 7, 1994, now abandoned, incorporated by reference in its entirety, and U.S. application Ser. No. 08/267,043, filed Jun. 28, 1994, now abandoned, incorporated by reference in its entirety.

Figure 1:
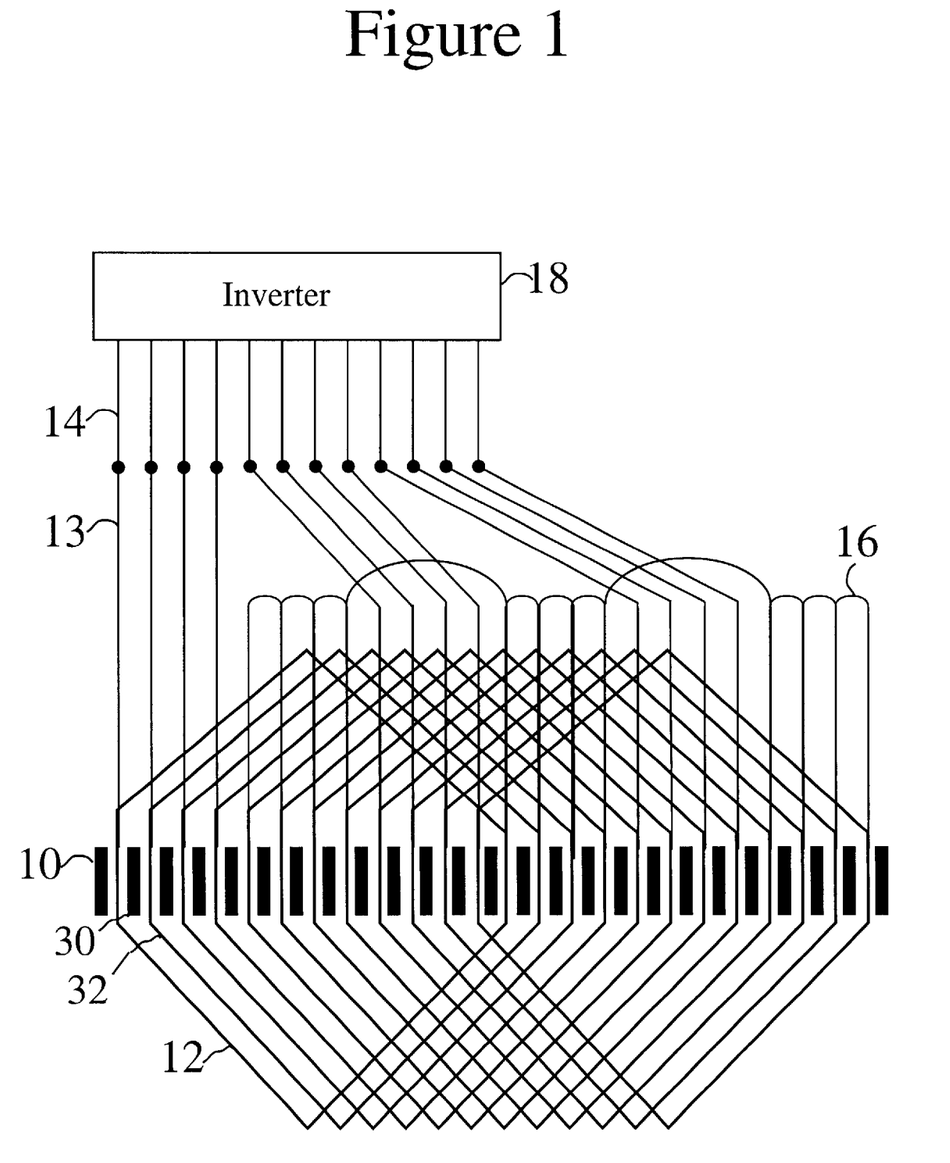
FIG. 1 is a schematic representation of the winding of a twelve phase induction machine of the present invention.

A typical embodiment of the present invention is presented in FIG. 1. The present invention is embodied on standard induction motor frames, and as such the figure presents a winding diagram which would be applicable to such a frame. A stator 10 is represented schematically, using thick bars to represent the stator teeth and the spaces between the bars to represent slots. Coils 12 are represented by thick lines passing through appropriate slots. Coil end leads 13 are represented by thin lines, which continue as leads 14 to an inverter 18 or which terminate at a star point 16.

FIG. 1 is a schematic representation of an embodiment of the present invention characterized by the following: 24 slot stator 10; 1 to 13 span windings 12; coil ends 13 1, 2, 3, 4, 9, 10, 11, 12, 17, 18, 19, and 20 connected to twelve phase inverter system 18 by means of leads 14; and coil ends 5, 6, 7, 8, 13, 14, 15, 16, 21, 22, 23, and 24 connected to a star point 16. Stator 10 includes stator teeth 30 and slots 32. Windings 12 pass through slots 32. Inverter system 18 is comprised of a plurality of inverters, such that the number of inverters is equal to the number of phases desired.

If inverter system 18 uses half bridge inverters, one winding end of each winding 12 is coupled to coil end lead 13 and is in turn coupled to lead 14. Lead 14 is coupled to an inverter in inverter system 18. The other winding end of each winding 12 is coupled to star point 16. Each coil thus has a driven end, which is the end that is coupled to the inverter system, and a back end, which is the end that is coupled to star point 16. If, however, a full bridge system was used, each end of winding 12 would be coupled to a coil end lead 13, and none of the coils would be connected to star point 16.

When using star point 16, or a neutral point, the number of half bridges is halved. To accomplish this in the present invention, each winding has two ends or terminations. Rather than connecting an inverter to each end and driving the ends with 180° degree phase difference, an inverter is connected to one winding end 13, and the other winding end is connected to star point 16. When the net current at star point 16 is zero, the voltage at star point 16 will be constant, and the winding will be energized properly.

To achieve the state in which net current at star point 16 is zero, the driven winding ends may be selected to have electrical angles that either divide 360° degrees evenly, or be selected in independent subsets which divide 360° degrees evenly. For example, with a twenty-four slot stator spanning slots 1:13, twenty-four coil ends may be used, with coil ends (driven ends) 1, 2, 4, 7, 9, 10, 12, 15, 17, 18, 20, and 23 connected to a twelve phase inverter via leads and coil ends (back ends) 3, 5, 6, 8, 11, 13, 14, 16, 19, 21, 22, and 24 connected to a star point.

Figure 2:
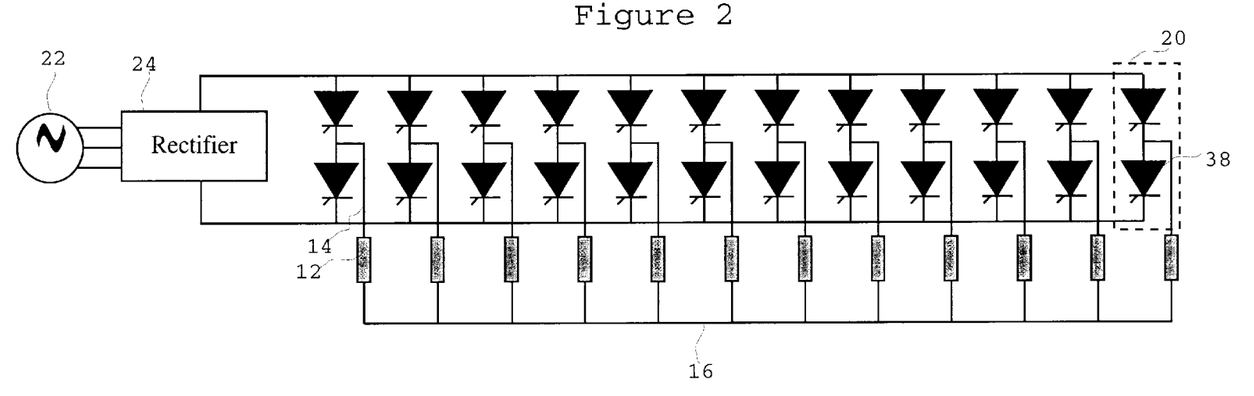
FIG. 2 is a schematic representation of a twelve phase DC link inverter drive system using half bridge drive for each phase.

FIG. 2 is a detailed schematic of the twelve phase inverter 18, showing an AC power supply 22 supplying a rectifier 24 which supplies DC power to half bridges 20. Half bridges 20 alternately switch their output leg between the positive and negative DC supply, synthesizing suitable alternating current output. Alternating current output is fed via the leads 14 to the windings 12. As this is a schematic diagram, the representations of the windings 12 and the leads 14 are very different between FIGS. 1 and 2, however it will be clear to an individual skilled in the art that these representations describe the same structures. Each half bridge 20 includes two controlled switches 38. Controlled switches 38 may, for example, be transistors. The apparatus depicted in FIG. 2 depicts twelve half brides 20; the dashed outline of half bridge 20 is omitted from all but the last inverter for purposes of simplifying the figure.

Figure 3:
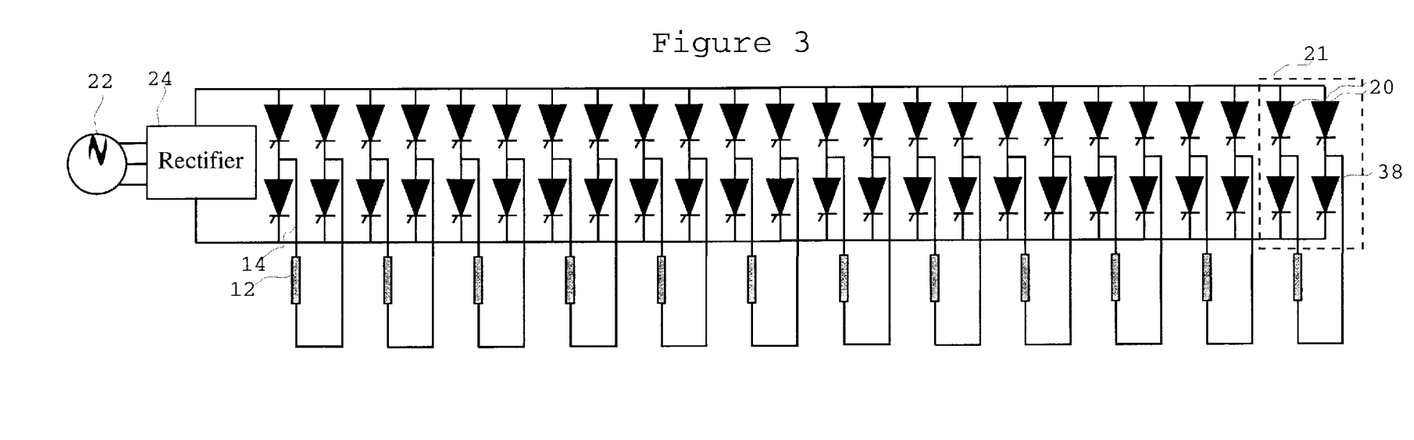
FIG. 3 is a schematic representation of a twelve phase DC link inverter drive system using full bridge drive for each phase.

FIG. 3 is a detailed schematic of a twelve phase full bridge inverter. In this schematic, two half bridge elements act together as a single full bridge element 21, supplying AC power to both ends of the windings 12. The use of a full bridge inverter doubles the power handling capacity of the device, and removes consideration of star point balance, however it substantially increases inverter complexity. Operation is conceptually similar to that of the half bridge inverter, and is known in the art. In this figure, two half bridge 20 elements, each including two controlled switches 38, act together as a single full bridge element 21. Further, in this example, a twelve phase DC link inverter drive system is depicted, thus there are twelve full bridges 21. The present invention includes greater than three phases, and would have a number of full bridges 21 equal to the number of windings. Because a full bridge is comprised of two half bridges, and each winding has a half bridge at each end, the number of half bridges used with a full bridge system is equal to twice the number of phases. Further, the apparatus depicted in FIG. 3 shows twelve full bride inverters 21; the dashed outline of full bridge 21 is omitted from the all but the last full bridge inverter to simplify the figure.

The present invention is applicable to all geometries of the AC induction machine. It is further applicable to both squirrel cage and wound rotor machines. The present invention is also applicable to all different inverter topologies used for the operation of three phase machines. These include voltage mode pulse width modulation inverters, which provide an alternating current regulated to a specified RMS voltage, current mode pulse width modulation inverters, which provide an alternating current regulated to a specified RMS current. Also included are linear inverters which provide true continuous output, both current mode and voltage mode. Also included are DC link inverters, resonant link inverters, and cycloconverters, all of which are different modes of supplying power to the inverter legs. Power factor correction hardware may be used on the input legs of the inverter drive system, and regeneration capability may also be a functional part of the inverter drive system. Square wave inverters with extremely high harmonic content in the output wave form may be used. Push pull inverters may be used, doubling the effective voltage capability of the inverter drive system, at the expense of using more active devices. The range of inverter topologies available will be apparent to an individual skilled in the field of three phase inverter drive systems.

The methods used to configure the windings of the present invention are analogous to methods used for three phase windings, however, there are numerous differences, such as:

a) Pole/phase groups generally involve only a single slot.

b) Winding distribution factors are nearly unity, windings being distributed across the width of a single slot.

c) Full span windings are generally used, increasing motor end copper.

d) A winding generally comprises a single coil in a single slot pair. The full phase voltage is therefor applied to a single coil, necessitating high turn counts. This is offset by the fact that each phase only carries a fraction of the entire supply current.

e) Phase angle for a given phase depends only upon the electrical angle of the phase winding associated with the phase.

The relationship between flux per pole is given by the following formula, taken from three phase design practice:

$$\text{Flux/pole} = \frac{22{,}500{,}000 \times \text{coil voltage}}{\text{frequency} \times \text{turns/coil} \times K_d \times K_s}$$

Where flux per pole is given in lines of force ($10^{-8}$ Webers), coil voltage is in Volts, frequency is in Hertz, $K_d$ is the winding distribution factor, and $K_s$ is the winding chord factor. These variables have precisely the same meaning herein that they have in three phase motor design. For a two pole machine with a single coil per phase, phase voltage and coil voltage will be the same. For higher pole counts, windings of corresponding phase may be interconnected in either series or parallel configuration, as in conventional three phase machines, thus phase voltage may be different from coil voltage.

As in conventional three phase motor design, a maximum flux per pole is selected based upon stator size, air gap size, and saturation considerations. Phase voltage is selected based upon inverter design considerations.

In the present invention, a single phase winding will generally occupy a single slot per pole, thus the winding distribution factor may be 1 or approximately 1. In the present invention, full span windings are used, leading the winding chording factor to be 1 or approximately 1. The use of distributed windings is possible in the present invention, possibly as a design trade-off wherein fewer inverter legs are used at the expense of poorer harmonic utilization. When it is said that the winding distribution factor is approximately 1 or that the winding chording factor is approximately 1, this means that minor imperfections, minor deviations, or other manufacturing variations result in the winding distribution factor or the winding chording factor being approximately 1, for example between 0.99. and 1.0, or between 0.995 and 1.0, or between 0.996 and 1.0, or between 0.997 and 1.0, or between 0.998 and 1.0, or between, or between 0.999 and 1.0. In the present invention, winding sides occupy a single slot, which would normally be considered to have a winding distribution factor of 1; however, windings have a finite width and thus may have a distribution slightly less than 1 (e.g. between 0.99 and 1.0).

Thus the present invention has the full phase voltage, or a large fraction thereof, applied to each coil. Full pitch windings will in general be used, and in general adjacent coils will not be connected together to form phase bands.

A major difference between conventional three phase design practice and the present invention is that in the present invention, is the selection of the appropriate phase angle for each phase. In conventional three phase design, the phase angle between adjacent phases is 120°, with phase belts being placed 120 electrical degrees apart in the stator winding. In the present invention, the phase angle of the alternating current supplied by a given inverter leg is arbitrary, and defined by the inverter control system. The phase angle between the alternating current supplied to any two phases is simply made to be equal to the electrical angle between the coils driven by the phases. This electrical angle need not subdivide the stator evenly.

For example, a twelve phase, two pole machine may be constructed in a twenty-four slot stator by winding twelve coils of 1 to 13 pitch. Each coil is fifteen electrical degrees apart, thus the phase angle of the current supplied by each phase of the inverter drive system is fifteen degrees apart. Such a configuration would work well if push pull inverters where used which were connected to both sides of each phase coil. It will be noted that the phase angle between phase twelve and phase one is 195°. This is acceptable owing to the fact that electrical locations 180° to 345° are the 'back sides' of the driven coils. Were it desired to use half bridge inverters with star connected windings, then the above imbalanced connection would not be acceptable. A balanced drive configuration may be achieved by driving the coil ends at slots 1, 2, 3, 4, 9, 10, 11, 12, 17, 18, 19, and 20, and star connecting the other coil ends. In this case the phase angles between phase 1 driving the coil end at slot one would be: 0°, 15°, 30°, 45°, 120°, 135°, 150°, 165°, 240°, 255°, 270°, and 295°. Despite the uneven phase angles, the motor will be driven smoothly.

To reiterate, in the present invention, the phase angle of the alternating current used to supply each phase is matched to the electrical angle of each phase winding within the motor. Symmetry in terms of the vector sum of all phase angles used is necessitated only by a star connection to the inverter drive system. Phases need not be evenly spaced throughout the stator.

The variable voltage, variable frequency inverter drive system is an industry standard, with known benefits. With such systems, a motor may be driven between zero speed and a maximum rated RPM. The motor may be dynamically braked, or operated in a regenerative mode, where the motor is slowed down by converting kinetic energy back into electrical energy, such electrical energy being fed back to the supply of electrical energy.

The use of feedback systems, known in the art for three phase machines, is equally applicable to the present invention. In such systems, controller frequency and voltage are adjusted in response to the desired operation of the rotating machine and to the measured actual operation. For example, if the measured speed were below the programmed speed, a feedback control system would command higher frequency AC drive. The capability of such feedback systems will be enhanced by the greater torque capability of the many phase motor of the present invention.

To produce the polyphase inverter drive system of the present invention, additional phase legs and alteration of the drive logic to supply output wave-forms of suitable shape and phasing is used. Additionally, other points about the present invention are:

a) Stator windings, and thus electrical phase angles, are not necessarily evenly distributed.

b) Push/pull inverter legs may be used to drive both sides of each phase.

c) The need for high switching frequencies, used in three phase machines to reduce harmonic content of the drive wave-form, is reduced. Because of the high tolerance for harmonics in the drive wave-form, square wave inverters may be used, giving benefit in terms of inverter cost.

d) Many inverters are effectively operating in parallel, allowing the use of smaller devices and giving greater fault tolerance.

Specific mention of microcontroller systems should be made. Such systems are currently used in three phase drive application, wherein the microcontroller, under software control, develops pulse width modulated control signals for each of the three inverter legs. Through the simple expedient of adding additional output subroutines and using additional output lines, such a microcontroller may be used to control additional inverter legs, thus forming an inverter drive system of higher phase count.

The industry standard induction machine is the squirrel cage induction motor. In this motor, the region of interaction between the stator and the rotor may be considered the surface of a cylinder. Rotation is about the axis of the cylinder, lines of magnetic flux pass through the cylinder normal to the cylinder, and current flow in both the stator conductors and the rotor conductors is parallel to the axis of the cylinder.

The present invention is applicable to any geometry in which the region of interaction between stator and rotor has circular symmetry about the axis of rotation, magnetic flux is generally normal to the region of interaction, and current flow is generally perpendicular both to flux and the direction of motion.

Alternative geometries which may be utilized in the present invention are axial flux 'pancake' motors, radial flux geometries in which the rotor is external to the stator, or geometries which use a combination of axial and radial flux, or multiple axial flux paths. Of particular interest is the latter geometry, wherein a dual sided pancake stator is surrounded on both faces by pancake rotor.

The region of interaction, or airgap, in the above geometry consists mainly of the two disks on the faces of the stator. Magnetic flux flows in a perpendicular fashion through the airgap, generally parallel to the axis of rotation. Machine slots and conductors are arranged in the radial fashion, thus current flow is radial, magnetic flux axial, and force tangential. Thus rotation is produced. The particular attraction of this geometry is that rotor end copper usage is reduced to a minimum, particularly advantageous in large rotating machinery of low pole count.

In conventional three phase motor design, flux densities in the stator iron are generally limited to 120,000 lines per square inch (1.86 Tesla), a value which will change depending upon the magnetic steel used. At best, flux densities in conventional phase motor designs are equal to the lines per square inch for the linear operation of the material used. From consideration of stator iron cross sectional area, tooth area, and air-gap area, as well as the maximum desired flux density, the design flux per pole may be selected, and winding calculations performed as above. The present invention, however, exhibits saturation effects, which means that it operates in the non-linear region of the saturation curve of the material used in the stator, otherwise known as the saturation flux curve of the material used in the stator.

Output torque capability of a machine scales as the square of the flux density. There is, therefore, good reason to increase the design flux density. In a conventional three phase machine, increased flux density would mean excessive harmonic losses, however this is not the case with the present invention. In the present invention, harmonic rotating magnetic fields generated by saturation rotate in synchronism with the fundamental rotating magnetic field. Under the present invention, it is therefore practicable to design for machines with flux densities of 150,000 lines per square inch (2.33 Tesla) or more, including, for example 200,000 lines per square inch (3.11 Tesla). Further, in terms of minimizing reactive power consumption, under the present invention it is possible to design for conventional flux densities, but allow for over voltage operation for a short period overload. The amount time the present invention may be operated at short period overloads depends on the specificities of the specific implementation of the present invention (e.g., thermal mass of the specific implementation of the present invention and other characteristics of the specific implementation of the present invention). Use during a short period overload allows time rated output considerably greater than the prior art. An example of such a short period overload is less than thirty seconds, or alternatively less than a minute. Another example would be a 10 horsepower motor of the present invention, time rated at 30-seconds for a power output of 100 horsepower.

Preferably, under the present invention, the maximum torque capabilities may be increased by preferably 200% or more through the use of high flux densities, and more preferably by 300% or more. This is because the present invention can operate in the non-linear region of the saturation curve for the material used in the stator.

As noted above, the phase angle at which a given phase is driven is equal to the electrical angle of the coils which belong to that phase. However, the measured electrical angle is relative to the pole configuration developed. If the phase angle at which a given phase is driven is changed, the pole configuration should be changed such that phase angle and electrical angle will match.

For example, a twelve phase two pole motor may be constructed. Normal operation would use a phase angle of fifteen degrees between adjacent phases. However, if a phase angle of forty-five degrees were used, then the machine would operate as a six pole machine. The maximum pole count which may be used is equal to the number of stator slots. In general, the use of higher pole counts than the minimum is of little benefit to machine operation. However the pole changing capability is noted as an interesting and perhaps useful aspect of the present invention.

As mentioned above, the excitation applied to a given stator winding is matched to the electrical angle of the winding. The windings need not be evenly spaced, and thus the relative electrical phase angles between inverter output legs need not be evenly spaced. There are, however, symmetry considerations which come into play when determining winding position and electrical phase angle.

One consideration is that the conductors in the stator are usually formed into coils; this is why the term "winding" is used in the present specification as the name for the assemblage of stator conductors. A characteristic of a coil used in an electric motor is that it has two sides, and that each side sits in a stator slot. The current flowing in one winding half will flow in the opposite direction of the current flowing in the other winding half. This means that the current flowing in each winding half is 180 degrees away from the current flowing in the other winding half. Winding halves are placed in the stator such that they span between 120 and 180 electrical degrees, and in the method of the present invention are placed such that they span 180 electrical degrees.

Another consideration is the issue of drive balance. The inverters are connected to the motor such that there is always a complete circuit for any current flow. This may be achieved by using full bridge drive, in which both sides of any given coil are connected to an inverter half bridge, and four switching elements are used to control the current flowing in any given coil. This, however may be an unnecessary expense, as star connected windings may be used which reduce the number of switching elements per coil to two.

When star connected windings are used, current flows from a half bridge, to the corresponding coil, to the star point, then through a different coil, and back to the inverter system through the corresponding half bridge. The driven coil ends are selected to allow for balanced drive, else the current flow may not be even. A balanced drive may be achieved by selecting driven winding ends in sets which have odd numbers and which are symmetrically distributed. Most commonly, in the case of motors wound with a multiple of three phases, driven winding ends are selected in sets of three, and in each set the windings are driven 120 electrical degrees apart.

Thus, for example, an eighteen phase machine having 18 windings in 36 slots may have winding ends at: 0°, 10°, 20°, 30°, 40°, 50°, 120°, 130°, 140°, 150°, 160°, 170°, 240°, 250°, 260°, 270°, 280°, and 290° be driven. As described above, this will result in a balanced drive. However, this may not be best winding connection possible.

A better connection may include a winding connection which is not only balanced for the primary, or fundamental waveform, but which is also maximally balanced for harmonic waveforms. In the above example, the winding is not balanced for the third harmonic, and will thus exhibit uneven flow of the third harmonic. The general rule for selection of winding connections is that the winding connections are preferably maximally distributed. Thus, for this example with an 18 phase machine, with star connection, a possible connection might be: 0°, 10°, 40°, 50°, 80°, 90°, 120°, 130°, 160°, 170°, 200°, 210°, 240°, 250°, 280°, 290°, 320° and 330°. This winding is perfectly balanced for the fundamental, third, fifth, and seventh harmonic, and exhibits unbalanced drive at the ninth harmonic.

In general, winding balance is achieved when the total phase count is an odd number. For an even numbers of phases, balance is achieved by dividing the phases up into symmetric sets of odd numbers of phases. In the above 18 phase example, it may be noted that the selected driven winding ends belong to two sets of 9 phases each, with each 9 phase set being symmetric.

A prototype of the invention was built and operated for testing. The elements contained within the prototype should not be considered to be the best mode of the invention for commercial purposes, as the prototype was assembled with the sole purpose of expeditiously proving the advantages of the invention. In order to provide a full disclosure, and to insure that an individual of even minimal skill in the art could reproduce my results, the prototype merits its own description and description of operation. Many specificities are mentioned here; they should not be considered as limiting the scope of this patent in any way.

The elements of the prototype are as follows. The motor was custom wound on a standard frame from which the production winding was removed. The frame used was from a two pole, totally enclosed, fan cooled, size 184T machine. This machine was originally rated at 5 horsepower (4 kW) at 3500 RPM. Internally, the machine had a twenty-four slot stator and a squirrel cage rotor with cast aluminum conductors. The machine was rewound with a twelve phase, two pole stator winding with all coil ends brought out to external termination. Coil span was 1 to 13, giving a fill span winding, and 50 turns per coil was used.

The inverter drive system was based upon the International Rectifiers "Design Tips" booklet numbered DT 93-6, based upon the IR2130 interface chips. The inverters were hand wire wrapped units, using IRGPC30FD2 IGBT transistors as the power devices. No provision was made for the DC supply, and a standard laboratory supply was used as the primary DC power source for testing. Four three phase inverters were used to supply twelve independent phases to the motor. (A later version used a single IR2130 per phase to allow for greater experimental isolation).

Logic control for the inverter drive systems was provided by a general purpose IBM compatible computer. Twenty four bits of parallel output were used to supply the on/off coding to the IR2130 controller chips. Software running on the computer provided pulse width modulated signals of appropriate phasing to operate the motor. Phase angle was adjustable so as to demonstrate pole changing. Additionally, output wave-form was adjustable, and square wave operation was demonstrated using the prototype apparatus.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that changes or modifications in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

All publications and patent applications mentioned in this specification are indicative of the level of skill of those skilled in the art to which this invention pertains. All publications and patent applications mentioned in this specification are herein incorporated by reference to the same extent as if each individual publication or patent application was specifically and individually indicated to be incorporated by reference.

I claim:

1. A method for employing rotating harmonic fields to increase torque and efficiency of an electrical rotating machine, said method comprising:

wiring an electrical rotating machine with windings, said windings positioned at relative electrical angles, the number of said windings being greater than three, wherein said windings have a winding chording factor of approximately 1;

supplying each of said windings with an individual phase of alternating current, said alternating current having more than three phases, wherein said alternating current comprises fundamental and harmonic current;

controlling each of said phases of said alternating current such that the relative phase angle of each of said phases corresponds to said relative electrical angles of each of said windings; and operating said electrical rotating machine at flux density levels that exhibit saturation effects.

2. The method of claim 1, wherein a winding distribution factor of said stator is approximately 1.

3. The method of claim 1, wherein said flux density levels are greater than or equal to 150,000 lines per square inch.

4. The method of claim 1, further comprising:

providing said alternating current from an inverter drive system, wherein said inverter drive system comprises half bridge inverters, wherein said windings are star connected and further wherein the driven ends of said windings are maximally distributed.

5. The method of claim 1, further comprising:

operating said electrical rotating machine at flux density levels that exhibit saturation effects for a short period overload.

6. A method of operating an electrical rotating machine, said method comprising:

providing an inverter drive system that provides an alternating current comprising more than three phases;

electrically coupling windings of a stator to said inverter drive system, wherein a winding chording factor of said stator is approximately 1, wherein said alternating current drives said windings, and wherein said stator generates a rotating magnetic field that comprises a fundamental rotating magnetic field and harmonic rotating magnetic fields;

electromagnetically coupling a rotor to said rotating magnetic field generated by said windings; and rotating said fundamental rotating magnetic field and said harmonic rotating magnetic fields in synchronism.

7. The method of claim 6, wherein a winding distribution factor of said stator is approximately 1.

8. The method of claim 6, further comprising rotating said fundamental rotating magnetic field and a set of said harmonic rotating magnetic fields in synchronism, wherein said harmonic rotating magnetic fields are of harmonic order less than the number of phases.

9. The method of claim 6, wherein said stator is a two pole stator.

10. The method of claim 6, wherein said electrical rotating machine is operated at high flux saturation levels, wherein said high flux saturation levels are of a flux density greater than or equal to 150,000 lines per square inch.

11. The method of claim 6, wherein said alternating current has a square wave-form.

12. The method of claim 6, wherein said alternating current has a sinusoidal wave-form.

13. The method of claim 6, wherein said phases vary in phase angle.

14. The method of claim 6, wherein said inverter drive system comprises half bridge inverters.

15. The method of claim 14, wherein said windings are star connected and further wherein the driven ends of said windings are maximally distributed.

16. The method of claim 6, wherein said inverter drive system comprises full bridge inverters.

17. The method of claim 6, further comprising:
operating said electrical rotating machine at high flux saturation levels for a short period overload.

18. The method of claim 17, wherein said short period overload is less than or equal to thirty seconds.

19. An electrical rotating machine comprising:
an inverter drive system;
a stator comprising a plurality of slots and windings, wherein said windings are electrically coupled to said inverter drive system, wherein said inverter drive system produces an alternating current comprising more than three phases that is fed into said windings, and further wherein a winding chording factor of said stator is approximately 1;
a rotor electromagnetically coupled to a rotating magnetic field generated by said windings, wherein said rotating magnetic field comprises a fundamental or first harmonic component, and second and greater harmonic components, and wherein said second and greater harmonic components rotate in synchrony with said fundamental component.

20. The electrical rotating machine of claim 19, wherein a winding distribution factor of said stator is approximately 1.

21. The electrical rotating machine of claim 19, wherein said stator is a two pole stator.

22. The electrical rotating machine of claim 19, wherein said machine has a flux density level of greater than or equal to 150,000 lines per square inch.

23. The electrical rotating machine of claim 19, wherein said stator comprises a ratio of phases to poles of greater than or equal to twelve phases per two poles.

24. The electrical rotating machine of claim 19, wherein said stator comprises irregularly positioned windings, and wherein said alternating current has an asymmetric phase distribution.

25. The electrical rotating machine of claim 19, wherein said inverter drive system comprises half bridge inverters.

26. The electrical rotating machine of claim 25, wherein said windings are star connected and further wherein the driven ends of said windings are maximally distributed.

27. The electrical rotating machine of claim 19, wherein said inverter drive system comprises full bridge inverters.

28. The electrical rotating machine of claim 19, wherein a winding side of said windings occupy a single slot in said stator.

29. The electrical rotating machine of claim 19, wherein the phase angle differences between the phases are not all identical.

30. The electrical rotating machine of claim 19, wherein the number of phases of said alternating current is greater than or equal to twelve.

31. The electrical rotating machine of claim 19, wherein said rotating magnetic field comprises a flux distribution exhibiting saturation effects.

32. The electrical rotating machine of claim 31, wherein a winding distribution factor of said stator is approximately 1.

33. The electrical rotating machine of claim 31, wherein said stator is a two pole stator.

34. The electrical rotating machine of claim 31, wherein said machine comprises a flux density level of greater than or equal to 150,000 lines per square inch.

35. The electrical rotating machine of claim 31, wherein said stator comprises a ratio of phases to poles of greater than or equal to twelve phases per two poles.

36. The electrical rotating machine of claim 31, wherein said stator comprises irregularly positioned windings, and wherein said alternating current has an asymmetric phase distribution.

37. The electrical rotating machine of claim 31, wherein said inverter drive system comprises half bridge inverters.

38. The electrical rotating machine of claim 37, wherein said windings are star connected and further wherein the driven ends of said windings are maximally distributed.

39. The electrical rotating machine of claim 31, wherein said inverter drive system comprises full bridge inverters.

40. The electrical rotating machine of claim 31, wherein a winding side of said windings occupy a single slot in said stator.

41. The electrical rotating machine of claim 31, wherein the phase angle differences between the phases are not all identical.

42. The electrical rotating machine of claim 31, wherein the number of phases of said alternating current is greater than or equal to twelve.

43. The electrical rotating machine of claim 19, wherein said rotating magnetic field originates in said inverter having a relatively low switching frequency.

44. The electrical rotating machine of claim 19, wherein said rotating magnetic field originates in said inverter producing a sine wave output of interior quality.

45. The electrical rotating machine of claim 19, wherein said rotating magnetic field originates in inverter high power output operation.

46. The electrical rotating machine of claim 19, wherein said rotating magnetic field originates in the deliberate introduction of harmonics at the inverter stage.

47. The electrical rotating machine of claim 46, wherein a winding distribution factor of said stator is approximately 1.

48. The electrical rotating machine of claim 46, wherein said stator is a two pole stator.

49. The electrical rotating machine of claim 46, wherein said machine has a flux density level of greater than or equal to 150,000 lines per square inch.

50. The electrical rotating machine of claim 46, wherein said stator comprises a ratio of phases to poles of greater than or equal to twelve phases per two poles.

51. The electrical rotating machine of claim 46, wherein said stator comprises irregularly positioned windings, and wherein said alternating current has an asymmetric phase distribution.

52. The electrical rotating machine of claim 46, wherein said inverter drive system comprises half bridge inverters.

53. The electrical rotating machine of claim 52, wherein said windings are star connected and further wherein the driven ends of said windings are maximally distributed.

54. The electrical rotating machine of claim 46, wherein said inverter drive system comprises full bridge inverters.

55. The electrical rotating machine of claim 46, wherein a winding side of said windings occupy a single slot in said stator.

56. The electrical rotating machine of claim 46, wherein the phase angle differences between the phases are not all identical.

57. The electrical rotating machine of claim 46, wherein the number of phases of said alternating current is greater than or equal to twelve.

58. A method of operating an electrical rotating machine, said method comprising:

provide an inverter drive system that provides an alternating current comprising more than three phases;

electrically coupling windings of a stator to said inverter drive system, wherein a winding chording factor of said stator is approximately 1, wherein said alternating current drives said windings, and wherein said stator generates a rotating magnetic field that comprises a fundamental rotating magnetic field and a plurality of harmonic rotating magnetic fields;

electromagnetically coupling a rotor to said rotating magnetic field generated by said windings; and wherein said rotating magnetic field exhibits substantial harmonic content.

59. The method of claim 58, wherein a winding distribution factor of said stator is approximately 1.

60. The method of claim 58, further comprising rotating said fundamental rotating magnetic field and a set of said harmonic rotating magnetic fields in synchronism, wherein said harmonic rotating magnetic fields are of harmonic order less than the number of phases.

61. The method of claim 58, wherein said stator is a two pole stator.

62. The method of claim 58, wherein said electrical rotating machine is operated at high flux saturation levels, wherein said high flux saturation levels are of a flux density greater than or equal to 150,000 lines per square inch.

63. The method of claim 58, wherein said alternating current has a square wave-form.

64. The method of claim 58, wherein said alternating current has a sinusoidal wave-form.

65. The method of claim 58, wherein said phases vary in phase angle.

66. The method of claim 58, wherein said inverter drive system comprises half bridge inverters.

67. The method of claim 58, wherein said windings are star connected and further wherein the driven ends of said windings are maximally distributed.

68. The method of claim 58, wherein said inverter drive system comprises full bridge inverters.

69. The method of claim 58, further comprising:

operating said electrical rotating machine at high flux saturation levels for a short period overload.

70. The method of claim 69, wherein said short period overload is less than or equal to thirty seconds.

* * * * *